United States Patent [19]
Adamson et al.

[11] Patent Number: 5,734,894
[45] Date of Patent: Mar. 31, 1998

[54] METHODS AND APPARATUS FOR PROTECTING THE INTEGRITY OF PROCESS DATA STORED ON A REMOVABLE STORAGE MEDIUM

[75] Inventors: John R. Adamson, Warrington; Scott L. Kern, Perkasie; Thomas A. Satko, Warminster; Ellyse E. Smolenak, Quakertown, all of Pa.

[73] Assignee: Honeywell Inc., Minneapolis, Minn.

[21] Appl. No.: 429,281

[22] Filed: Apr. 25, 1995

[51] Int. Cl.$^6$ ............................................. G06F 17/30
[52] U.S. Cl. ............................................. 395/616; 395/621
[58] Field of Search ......................... 358/444; 364/707, 364/900; 365/229; 395/827, 425, 700, 750, 442, 616, 621; 371/10.2

[56] References Cited

U.S. PATENT DOCUMENTS

| | | | |
|---|---|---|---|
| 4,335,447 | 6/1982 | Jerrim | 364/900 |
| 5,175,842 | 12/1992 | Totani | 395/425 |
| 5,241,508 | 8/1993 | Berenguel et al. | 365/229 |
| 5,255,270 | 10/1993 | Yanai et al. | 371/10.2 |
| 5,349,448 | 9/1994 | Hirai | 358/444 |
| 5,349,661 | 9/1994 | Brewer et al. | 395/700 |
| 5,414,861 | 5/1995 | Horning | 395/750 |
| 5,418,841 | 5/1995 | Haraguchi et al. | 379/70 |
| 5,430,882 | 7/1995 | Tilghman et al. | 395/750 |
| 5,437,020 | 7/1995 | Wells et al. | 395/425 |
| 5,469,573 | 11/1995 | McGill et al. | 395/700 |
| 5,488,708 | 1/1996 | Hayashi | 395/442 |
| 5,519,663 | 5/1996 | Harper, Jr. et al. | 365/229 |
| 5,532,945 | 7/1996 | Robinson | 364/707 |
| 5,539,914 | 7/1996 | Fry et al. | 395/827 |
| 5,596,708 | 1/1997 | Weber | 395/182.04 |

*Primary Examiner*—Thomas G. Black
*Assistant Examiner*—Frantz Coby
*Attorney, Agent, or Firm*—Joseph J. Kaliko

[57] ABSTRACT

Methods and apparatus for preventing the loss and/or corruption of process data stored by data collection and/or test instruments (referred to hereinafter collectively as "recording instruments"), which may otherwise result from events such as the removal of aforementioned storage media while data transfer operations are in progress; loss of power to the recording instrument while data transfer operations are in progress; and/or the execution of internal CPU traps or other CPU reset conditions while data transfer operations are in progress. The methods and apparatus contemplated by the invention also provide for the recovery of process data which has been corrupted during a power loss or CPU reset when normal operation of a recording instrument resumes.

26 Claims, 13 Drawing Sheets

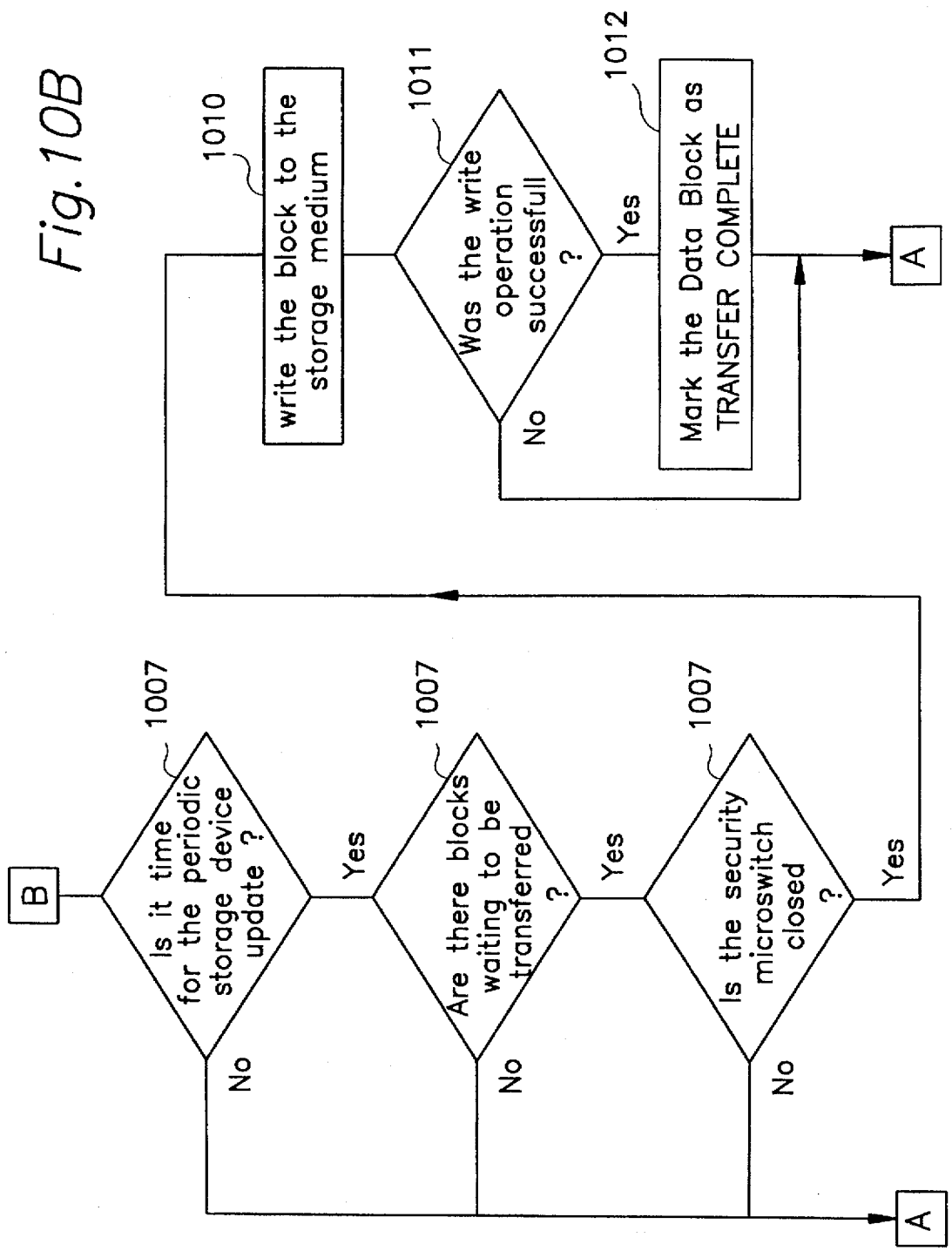

METHODS AND APPARATUS FOR PROTECTING THE INTEGRITY OF PROCESS DATA STORED ON A REMOVABLE STORAGE MEDIUM

BACKGROUND OF THE INVENTION

1. Field of the Invention

The invention relates generally to methods and apparatus used for protecting the integrity of process data stored on removable storage media such as floppy disks, PCMCIA memory cards, etc.

More particularly, the invention relates to methods and apparatus for preventing the loss and/or corruption of process data stored by data collection and/or test instruments (referred to hereinafter collectively as "recording instruments"), which may otherwise result from events such as the removal of aforementioned storage media while data transfer operations are in progress; loss of power to the recording instrument while data transfer operations are in progress; and/or the execution of internal CPU traps or other CPU reset conditions while data transfer operations are in progress.

Furthermore, the methods and apparatus contemplated by the invention provide for the recovery of process data which has been corrupted during a power loss or CPU reset when normal operation of a recording instrument resumes.

2. Description of the Related Art

Methods and apparatus for protecting the integrity of data stored on removable storage media are known in the prior art. For example, it is known that by using an Uninterruptible Power Supply (UPS), loss of data being transferred (again, by way of example) from storage in a computer to a removable floppy disk inserted into the computer, can be prevented should a power outage occur during the data transfer process.

When the nature of a given recording instrument and the recording environment permits, assuring data integrity on removable storage media (and recognizing that a problem may exist), can be as simple as an on site operator observing that a power failure has occurred or that a plug has been removed from a wall socket; observing that a warning appears on a computer display screen should, for example, a floppy disk be removed prior to an in progress data transfer being completed; or using hardware and software solutions, such as the aforementioned UPS and/or software for providing the aforementioned on screen warnings to an operator, etc., to recognize potential problems and protect data integrity.

The problems associated with assuring data integrity for data stored on removable storage media in operator attended mainframe or PC computing environments, and even for process data recording environments in which an operator performs "one-shot" utility type recording and is physically present to observe and control the data recording process; differ considerably from the problems experienced when trying to assure the integrity of process data being recorded on removable storage media by often unattended, field located, "stand alone" recording instruments (defined herein as instruments not requiring full time operator supervision or interaction to actually perform the data recording function), which is the type of recording instrumentation in which the present invention finds utility.

In the aforementioned environment in which the invention finds utility, the removable storage media rather than being used in the previously mentioned "one shot" utility type recording context, is typically used as a continuous storage medium. Furthermore, in the aforementioned environment in which the invention finds utility, UPSs are normally unavailable or too costly to provide data integrity protection; and operators do not normally attend the recording device over the whole continuous recording period which can run for days, weeks and even longer periods of time.

In view of the above, in the context in which the present invention finds utility, the problem of assuring the integrity of data recorded on the continuous medium is compounded by the fact that the safeguards of either being under assured continuous power and/or direct operator supervision, are not necessarily present.

Accordingly, it would be desirable to provide methods and apparatus for assuring the integrity of process data stored on a removable storage media associated with stand alone data recording instruments being used to continuously record process data.

Furthermore, it would be desirable to provide methods and apparatus for assuring the integrity of process data stored on a removable storage media in a manner that does not require the use of an external power source, such as an Uninterruptible Power Supply (UPS).

Still further, it would be desirable to provide methods and apparatus for assuring the integrity of process data stored on a removable storage media in a manner that does not require the full time presence of an operator to manage and observe the data recording process per se.

Further yet, it would be desirable to provide methods and apparatus which enable process data which has been corrupted during a power loss or CPU reset, to be recovered when normal operation of a recording instrument resumes.

SUMMARY OF THE INVENTION

Accordingly it is an object of the invention to provide methods and apparatus for assuring the integrity of process data stored on a removable storage media associated with stand alone data recording instruments being used to continuously record process data.

Furthermore, it is an object of the invention to provide methods and apparatus for assuring the integrity of process data stored on a removable storage media in a manner that does not require the use of an external power source, such as an Uninterruptible Power Supply (UPS).

Still further, it is an object of the invention to provide methods and apparatus for assuring the integrity of process data stored on a removable storage media in a manner that does not require the full time presence of an operator to manage and observe the data recording process per se.

Further yet, it is an object of the invention to provide methods and apparatus which enable process data which has been corrupted during a power loss or CPU reset, to be recovered when normal operation of a recording instrument resumes.

According to a preferred embodiment of the invention, several basic steps are performed to provide a secure data storage system: pre-allocation of file control structures; the organization of the process data into independent blocks; the use of a software implementable feedback system to verify that data has been successfully transferred to the storage medium; battery-backed storage of data blocks prior to storage; and means for detecting when the removable medium is not properly inserted in the instrument or about to be removed therefrom.

The information on the removable medium is protected against two basic causes of lost data: corruption of the file control structures for the medium, and corruption of the data control structures within a file.

Most file creation and management utilities, such as DOS, UNIX, etc., do not provide any inherent mechanism for assuring the integrity of file control structures transferred to a removable storage medium. However, according to one aspect of the invention, the file control structures can be protected by allocating file space on the medium during a one-time initialization procedure. Furthermore, according to the invention, no storage of process data is permitted until initialization has been successfully completed. The instrument will continue to accumulate process data in an internal memory (e.g., internal random access memory (RAM)), while initialization is taking place.

According to a further aspect of the invention, as indicated hereinabove, the process data within a given file is organized into independent blocks. The corruption of the data within one block will not affect the contents of any other block, or prevent access to any other block.

Still further, according to a preferred embodiment of the invention, the blocks are sequenced to provide organization control of the data; and the information contained within these blocks is also checksummed to detect the presence of corruption.

Furthermore, according to the invention, the instrument maintains a copy of the block information in RAM memory until an indication that the block has been successfully transferred to the storage medium is received. This feedback is required before the RAM resident copy of the block can be discarded. In the event of power loss or restart, the information in RAM memory may, according to a preferred embodiment of the invention, be maintained through the use of a capacitor-discharge battery device.

Further yet, according to a preferred embodiment of the invention, the recording instrument includes a micro-switch arrangement for generating a software detectable signal whenever the front door of the instrument (through which the removable media is installed and removed) has been opened.

Upon detection of this condition (also referred to herein as the condition where a removable medium is "not properly inserted"), software contemplated by the preferred embodiment of the invention (running on the instrument) will immediately stop any further transfer of data to or from the storage device. It should be noted that other conditions may also cause data transfer to be inhibited such as a write protect tab being in position on the medium, the medium being identified as other than the desired target medium, the file being written to being absent from the medium, etc.).

This action prevents the potential loss of data due to manual removal of the storage medium while data transfer is taking place. Data storage, according to the teachings of the invention, will not resume until the removable storage media is inserted in the instrument and the door has been closed (the only time when a removable medium is deemed to be "properly inserted" in the instrument).

According to one specific aspect of the invention, a method for protecting the integrity of process data stored on a removable storage media associated with a programmable stand alone data recording instrument that includes a random access memory (RAM), (preferably, but not necessarily backed RAM); and non-volatile memory (e.g., EEPROM, PROM, ROM and/or any other type of memory device that does maintains its contents without power), comprises the steps of:

(a) formatting the removable storage media;

(b) configuring a set of storage parameters used to partition the media, wherein the step of configuring includes the steps of specifying the parameters and storing the specified parameters in non-volatile memory;

(c) initializing the storage media for secure data storage operation by partitioning the media into a set of files utilizing the set of storage parameters stored in non-volatile memory; (d) generating a signal indicative of whether or not the medium is properly inserted in the instrument; and (e) managing process data received and/or derived by the instrument and the transfer of the data to the media, wherein the step of managing includes the steps of: (e1) building and storing data records in predefined RAM data blocks utilizing the data;

(e2) keeping track of the number of records built and stored; (e3) marking each block that is ready for transfer to the medium; (e4) determining, in response to the signal indicative of whether or not the medium is properly inserted in the instrument, if the media is properly inserted therein; (e5) writing to a file on the medium one of the blocks awaiting transfer thereto after it is determined in step (e4) that the removable media is properly inserted in the instrument; (e6) determining if the write operation was successful; and (e7) marking the data block in RAM to indicate the transfer was complete whenever it is determined in step (e6) that the write operation was successful.

As indicated hereinabove, and in accordance with a preferred embodiment of the invention, a one time allocation of file space on the medium is performed to thereby protect media file control structures from being corrupted; all process data within a given file on the medium is organized into independent blocks; and the independent blocks are sequenced for recovery purposes (to be explained in detail hereinafter).

According to a further aspect of the invention, directed to supporting data recovery efforts in the event of a RAM loss condition (defined herein as a condition that results from any type of RAM failure, including the running down of a back up power source in the event backed RAM is used), the aforementioned step of writing to the medium further comprises the steps of first writing a block awaiting transfer to the medium to a recovery area in a given file located on the medium; and then writing the same data block to a data storage portion of the file.

Still further aspects of the invention are directed to methods for insuring data integrity after the occurrence of a power loss condition; and methods for protecting the integrity of process data stored on a fixed storage media associated with a programmable stand alone data recording instrument that includes a Random Access Memory (RAM) and non-volatile memory.

Yet another aspect of the invention is directed to apparatus for protecting the integrity of process data stored on a removable storage media associated with a programmable stand alone data recording instrument, comprising: (a) programmable data processing means; (b) Input/Output means, coupled to the programmable data processing means, for receiving raw process data input to the instrument; (c) memory means, coupled to the programmable data processing means, for temporarily storing raw process data received and/or derived by the instrument; (d) non-volatile memory, coupled to the programmable data processing means, for storing a set of removable media configuration parameters; (e) media interface means, coupled to the programmable data processing means, for receiving the removable storage medium when properly inserted therein and making the storage medium available to the programmable data processing means for data transfer operations; and (f) means for generating a signal to the programmable data processing means whenever the removable media is not properly inserted in the media interface means, to enable the programmable data processing means to recognize a condition in which data transfer operations between the memory means and the storage medium is to be inhibited.

The invention features the ability to assure the integrity of process data stored on a removable storage media associated with stand alone data recording instruments being used to continuously record process data. No external power source, such as an Uninterruptible Power Supply (UPS), or operator attended recording is required. Furthermore, the invention features methods and apparatus which enable process data which has been corrupted during a power loss or CPU reset; or loss resulting from a RAM data loss condition, to be recovered when normal operation of a recording instrument resumes.

These and other objects, embodiments and features of the present invention and the manner of obtaining them will become apparent to those skilled in the art, and the invention itself will be best understood by reference to the following Detailed Description read in conjunction with the accompanying Drawing.

BRIEF DESCRIPTION OF THE DRAWING

FIG. 10A and FIG. 10B depict, in accordance with the teachings of one embodiment of the invention, an illustrative set of process steps for managing the data transfer process contemplated by the invention.

DETAILED DESCRIPTION

Figure 1:
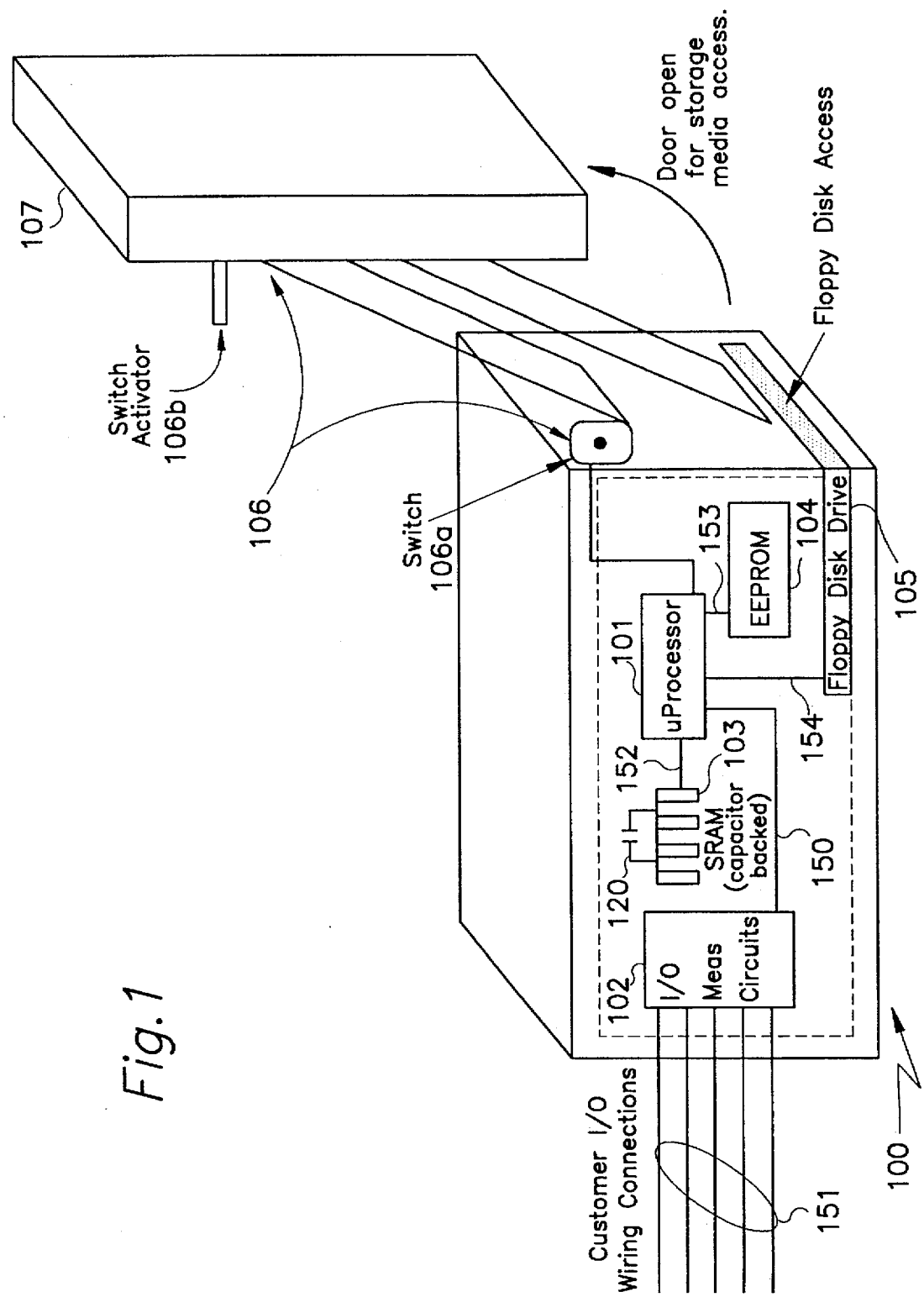
FIG. 1 depicts an exemplary programmable process data recording instrument of the type contemplated by one aspect of the invention for use in conjunction with a removable floppy disk.

Prior to describing the details of the apparatus and process steps contemplated by the invention, certain assumptions and definitions which have been made for the sake of illustration and convenience in providing this detailed description will be explained.

The term "disk" is used herein as a generic reference to the aforementioned removable storage medium. Those skilled in the art will readily appreciate that the processes set forth herein will work for any properly formatted devices (where the DOS format is used for the sake of illustration herein), including floppy disks (of any density), PCMCIA memory cards, etc.

As indicated hereinabove, the invention is presented, for the sake of illustration only, assuming that DOS is the file creation and management utility used for properly formatting the storage medium. Those skilled in the art will readily appreciate that other commercially available and/or user developed file creation and management utilities (e.g., UNIX, etc.), may be used to practice the invention after making appropriate modifications to take into account the utility dependent file control structures associated with a given utility.

Furthermore, the invention is set forth in the context of a stand alone recording instrument (to be described in detail hereinafter with reference to FIG. 1 and FIG. 2), assumed to include random access memory (RAM) within which process is organized for data transfer to the removable medium and stored, at least temporarily, prior to transfer to the medium.

According to the invention, the RAM is preferably backed (for example, a capacitor backed RAM), to insure that if external power to the instrument is interrupted the RAM contents will be maintained for (in the exemplary capacitor backed RAM instance) the discharge life of the capacitor (e.g., approximately 90 minutes in one embodiment of the invention). Again, it is not necessary for the RAM included in the recording instrument in which the invention is practiced to be backed; but it is preferable to increase the units ability to protect the integrity of process data being stored prior to successful transfer; and for providing a process data back up after data is transferred.

Finally, the stand alone recording instruments in which the invention may be practiced are assumed to be "programmable" devices; that is, devices that are provided with access to (and execute) programs which implement the various processes described herein to protect the integrity of the data being recorded on the removable storage media.

Specific examples of commercially available stand alone recording devices of the type contemplated by the invention (used to record process data) are microprocessor based video recorders and controllers available from Leeds & Northrup Company.

Those skilled in the art will readily be able to implement the processes described herein in the form of programs suitable for execution by a microprocessor, assuming a knowledge of the file creation and management utility being employed (such as the exemplary DOS utility) and having the benefit of the various flow charts depicted in the Drawing.

Reference should now be made to FIG. 1 which, as indicated hereinbefore, depicts an exemplary programmable process data recording instrument of the type contemplated by one aspect of the invention for use in conjunction with a removable floppy disk.

In particular, exemplary programmable process data recording instrument 100 shown in FIG. 1 depicts the device as including: programmable data processing means 101 shown, by way of example, as a microprocessor; Input/ Output (I/O) means 102, coupled to programmable data processing means 101 via link 150, for receiving raw process data input to said instrument via exemplary wiring connections 151 (where I/O means 102 as depicted in FIG. 1 may be any one of a number of well known circuit devices for measuring process data input); memory means 103, coupled to programmable data processing means 101 via link 152, for at least temporarily storing raw process data (received over links 150, 151 and 152), and/or process data derived by the instrument itself (derived via programmable data processing device 101); non-volatile memory means 104, shown coupled to the programmable data processing means via link 153, for storing a set of configuration parameters used to configure the removable media; media interface means 105, shown coupled to programmable data processing means 101 via link 154, for receiving the removable storage medium when properly inserted therein and making the storage medium available to programmable data processing means 101 for data transfer operations; and means for generating a signal, 106, to programmable data processing means 101 whenever the removable media is not properly inserted in media interface means 105, to thereby enable programmable data processing means 101 to recognize a condition in which data transfer operations between memory means 102 and the removable storage medium is to be inhibited.

An example of the aforementioned "means for generating a signal" (reference numeral 106), is depicted in FIG. 1 as a micro-switch arrangement (a switch 106a and switch activator 106b), for generating a software detectable signal (detectable by software running on programmable data processing device 101), whenever front door 107 of the instrument (through which the removable media is installed and removed) has been opened.

As indicated hereinbefore, in accordance with one aspect of the invention, upon detection of a "door open" condition (i.e., whenever switch activator 106b is not causing switch 106a to be activated), software contemplated by the preferred embodiment of the invention (running on programmable data processing device 101) will immediately stop any further transfer of data to or from the removable storage medium. This action prevents the potential loss of data due to manual removal of the storage medium while data transfer is taking place. Data storage, according to the teachings of the invention, will not resume until door 107 has been closed.

It should be noted that if door 107 is opened during a disk data transfer, the software will complete the transfer and then inhibit any further disk activity. The latency in the depicted exemplary system is approximately 100 milliseconds, which will allow the software to safely complete an active data transfer prior to ejection of the disk.

According to a preferred embodiment of the invention, instrument 100 will continue to accumulate process data in internal memory 103 while a data transfer initialization process (to be explained hereinafter) takes place.

Furthermore, according to a preferred embodiment of the invention, the information in exemplary RAM memory 103 may be maintained should a power failure occur through the use of a capacitor-discharge battery device, such as device 120 depicted in FIG. 1.

Finally, it should be noted that according to a preferred embodiment of the invention, although not depicted in the Drawing, software programs implementing the processes taught hereinafter are embedded in a read only memory (ROM) accessible to programmable data processing device 101. It should be further noted that the invention is not intended to be limited to this preferred (ROM) program storage mechanism.

Figure 2:
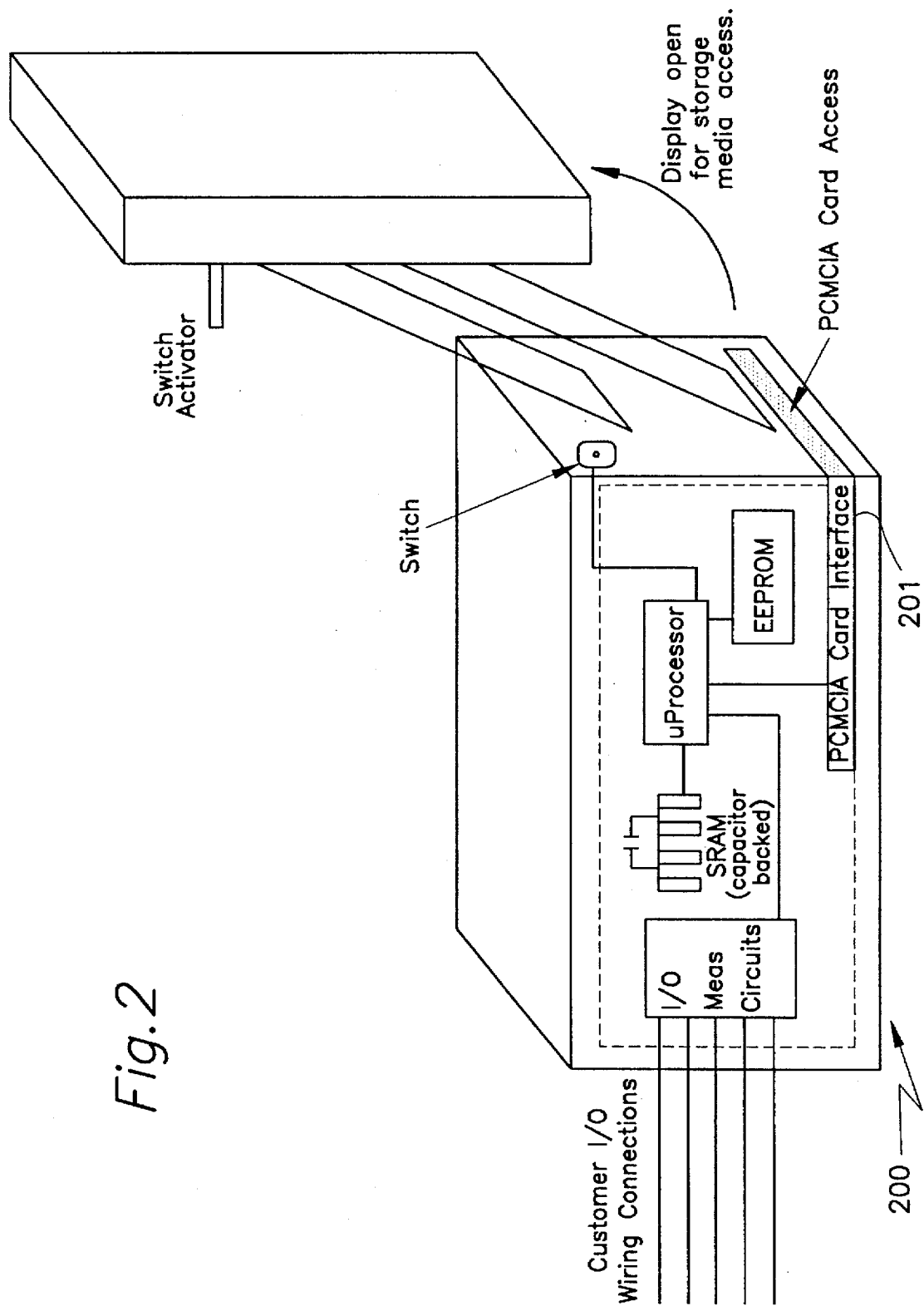
FIG. 2 depicts a further exemplary programmable process data recording instrument of the type contemplated by the invention for use in conjunction with a removable PCMCIA memory card.

Reference should now be made to FIG. 2 which, as indicated hereinbefore, depicts a further exemplary programmable process data recording instrument of the type contemplated by the invention for use in conjunction with a removable PCMCIA memory card.

In particular, FIG. 2 is identical to FIG. 1, with the exception that a PCMCIA card interface, 201, is shown within recording instrument 200.

Figure 3:
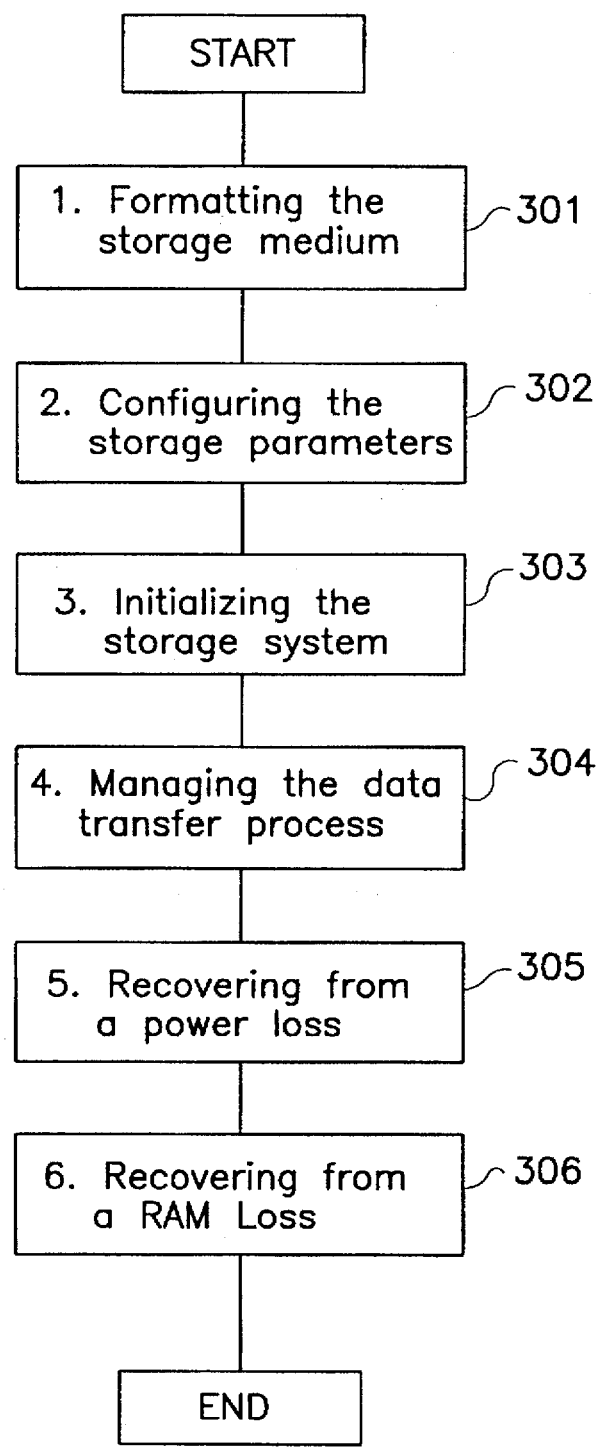
FIG. 3 depicts an overview of the data integrity protection process contemplated by a preferred embodiment of the present invention.

Reference should now be made to FIG. 3 which, as indicated hereinbefore, depicts an overview of the data integrity protection process contemplated by a preferred embodiment of the present invention.

The illustrative process depicted in FIG. 3 is shown to include steps directed to addressing three major considerations: (1) preparation of the removable storage medium and internal instrument storage facility (e.g., RAM), to support data integrity protection; (2) managing the data transfer process per se to achieve the desired data integrity protection; and (3) recovery operations (with some recovery features being optional, as will be explained hereinafter), following a power loss condition and/or a RAM loss condition (e.g., where RAM fails due to a power outage, expiration of a battery backed power window, etc.).

More particularly, the process overview depicted in FIG. 3, for that portion of the process dealing with the preparation of the removable storage medium and internal instrument storage facility to support data integrity protection, includes steps of: formatting the removable storage medium (shown at block 301); configuring the storage parameters (shown at block 302); and initializing the storage system (shown at block 303).

Each of aforementioned steps (shown at blocks 301, 302 and 303) will be explained in greater detail hereinafter with reference to FIG. 7, FIG. 8 and FIG. 9, respectively.

The FIG. 3 overview goes on to depict the step of managing the data transfer process per se (to achieve the desired data integrity protection), at block 304. This step will be explained in greater detail hereinafter with reference to FIG. 10A and FIG. 10B, which is a continuation of FIG. 10A.

Finally, the FIG. 3 overview depicts the preferred process steps of being able to recover from (i.e., insure data integrity following) a power loss condition (as shown at block 305); and recover from a RAM loss condition (as shown at block 306). These steps will be explained in greater detail hereinafter with reference to FIG. 11 and FIG. 12, respectively.

The RAM loss recovery feature (described with reference to FIG. 12), although being desirable and being included in the preferred embodiment of the invention, is considered an optional feature of the invention.

Prior to setting forth a detailed description of the methods contemplated by the invention, with specific reference to FIGS. 7–11; an explanation of suitable, albeit exemplary, logical layout for a DOS created set of disk (or memory card) file control structures; an exemplary logical layout for each of the data files being recorded and protected; and an exemplary logical layout for each data block in a given data file, will be set forth immediately hereinafter with reference to FIGS. 4–6, respectively.

Figure 4:
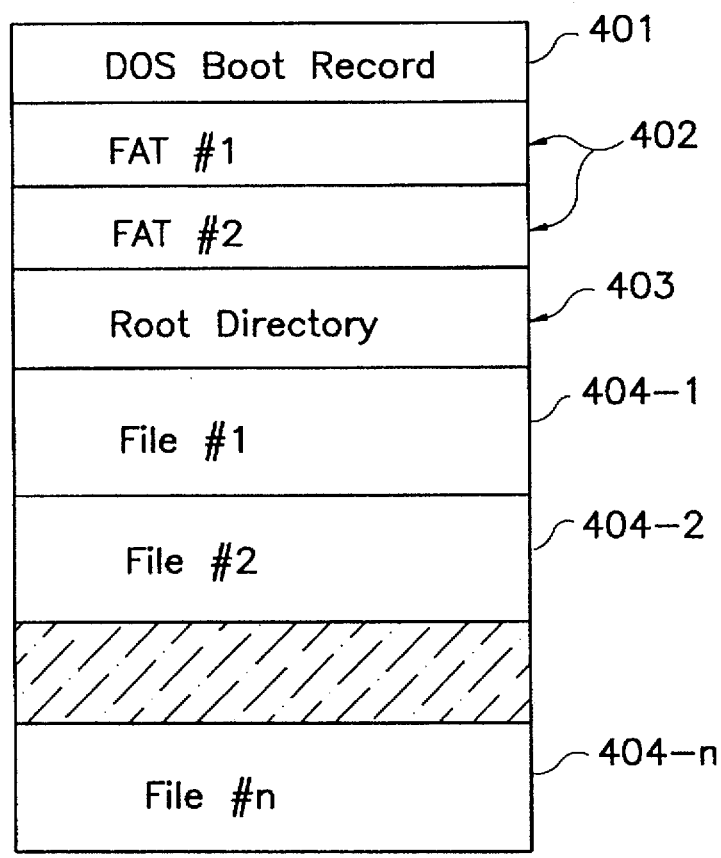
FIG. 4 depicts, in accordance with the teachings of one embodiment of the invention, an exemplary logical layout for a DOS created set of disk (or memory card) file control structures.

As indicated hereinbefore, FIG. 4 depicts (in accordance with the teachings of one embodiment of the invention), an exemplary logical layout for a DOS created set of disk (or memory card) file control structures. Those skilled in the art will readily appreciate how to utilize DOS to create such file control structures. Accordingly, the structures depicted in FIG. 4 are shown for the sake of completeness only, with the details of how the structures are created being considered well within the purview of those skilled in the art without the need for further explanation.

In particular, FIG. 4 shows the key DOS created control structures that must be protected to insure the integrity of the disk (again, assuming DOS is the utility used for file creation and management), namely: the DOS boot record, shown in FIG. 4 by reference numeral 401; the File Allocation Tables (FAT), two of which are shown in FIG. 4 by reference numeral 402; and the DOS Root Directory, shown in FIG. 4 by reference numeral 403.

The aforementioned DOS control structures provide basic DOS operating system access to the disk and all of its files.

FIG. 4 also shows a set of n files (shown via reference numerals 404-1 thru 404-n) created by the file creation and management utility. According to one embodiment of the invention, the data files are created by the user during the data storage initialization process shown at block 303 in FIG. 3 (to be explained in detail hereinafter with reference to FIG. 9). The number of files (and consequently, the amount of disk space to be used) may be specified by the user.

Figure 5:
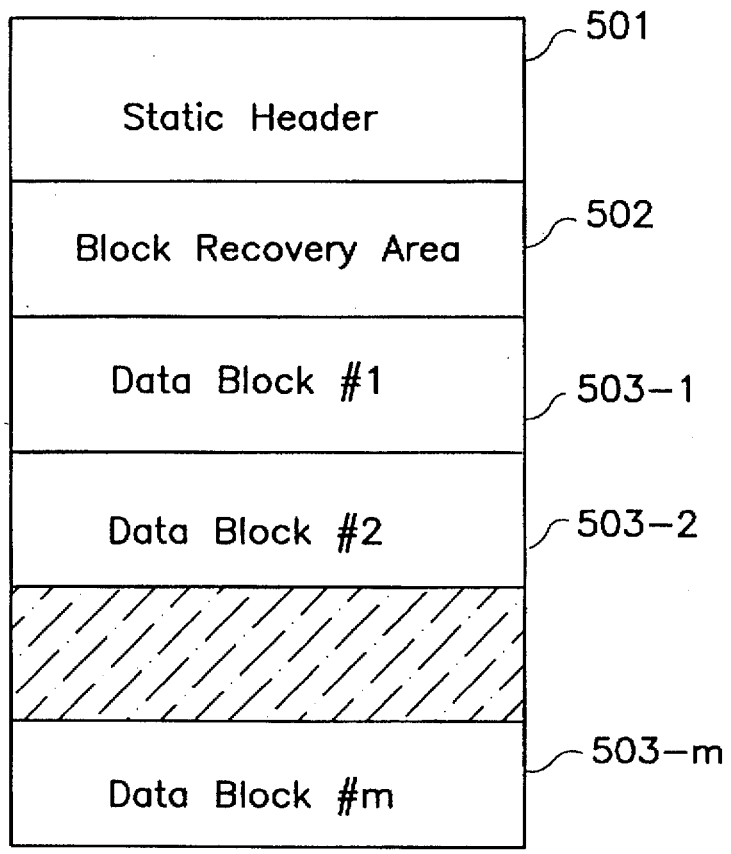
FIG. 5 depicts, in accordance with the teachings of one embodiment of the invention, an exemplary logical layout for each of the data files depicted in FIG. 4.

An additional control structure that is optionally created by the user, and must be protected when created (although not created by DOS), is the "static header", which may be seen with reference to FIG. 5 (reference numeral 501). The optional static header provides memory for the storage of process dependent information specified by the user, such as (for example) information that defines the internal structure of individual files. According to the preferred embodiment of the invention, the static header is written once, during the aforementioned data storage initialization process.

Those skilled in the art will readily appreciate that the aforementioned control structures can only be corrupted during an operation which writes to the disk. The data integrity protection techniques contemplated by the invention protects these structures by eliminating the need to write to them after the aforementioned data storage initialization process (shown at block 303 in FIG. 3 and explained in detail hereinafter with reference to FIG. 9), has been completed.

Further reference should be made to FIG. 5 which depicts the elements of an exemplary logical layout for each of the data files depicted in FIG. 4.

In particular, FIG. 5 depicts (in addition to the aforementioned preferred (but optional) static header block 501; a preferred (but optional) block recovery area, 502; and m data blocks shown as blocks 503-1 thru 503-m.

The optional block recovery area, according to the preferred embodiment of the invention, is used to maintain a "duplicate" block image on disk for memory loss recovery processing purposes (to be explained in detail hereinafter with reference to FIG. 10B, FIG. 11 and FIG. 12). The block recovery area (if configured and used) is updated as needed during the online data storage process (explained in detail hereinafter with reference to FIG. 10B).

The actual data blocks depicted in FIG. 5 (via reference numerals 503-1 thru 503-m), are also updated as needed during the online data storage process.

Figure 6:
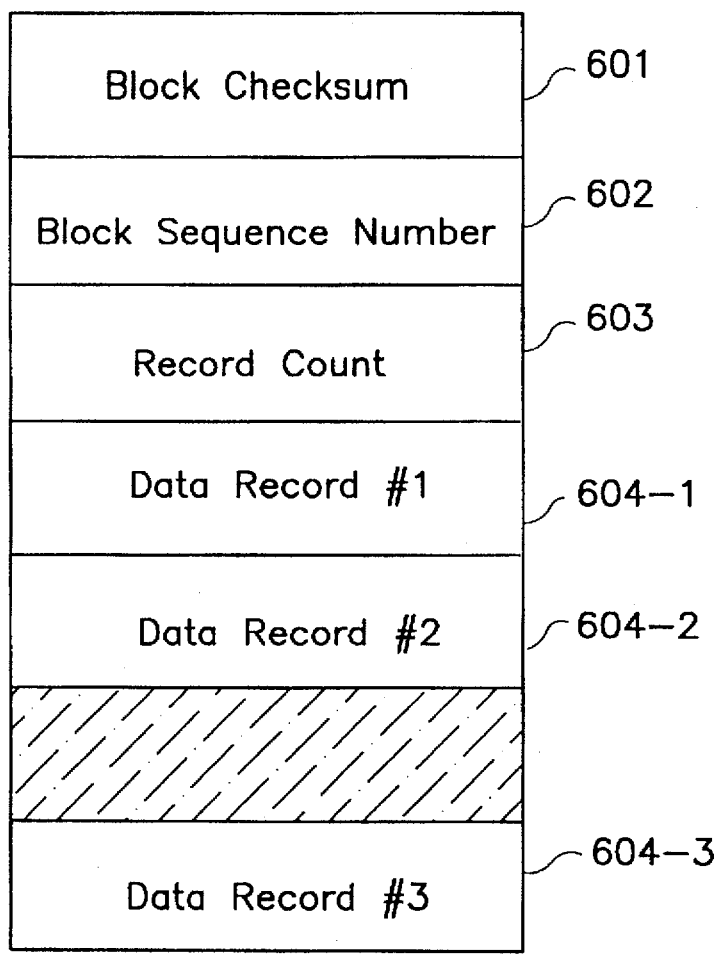
FIG. 6 depicts, in accordance with the teachings of one embodiment of the invention, an exemplary logical layout for each data block depicted in FIG. 5.

Reference should now be made to FIG. 6 which, as indicated hereinbefore, depicts an exemplary logical layout for each data block depicted in FIG. 5.

In particular FIG. 6 depicts block checksum 601; block sequence number 602; record count 603; and actual data records 604-1 thru 604-3.

Block checksum 601 is a check value which may optionally be used (and is used in a preferred embodiment of the invention) to determine if a block transfer is successful.

Block sequence number 602 is sequentially assigned numerical value which may be used to properly insert a recovered block, in the sequence of blocks in a given file on the medium, following a RAM loss condition, as will be explained in greater detail hereinafter with reference to FIG. 12.

Record count 603 is a numerical value indicative of the number of records in a given block within a file. For the example depicted in FIG. 6, record count 603 would be set to 3 indicating the presence of the three records illustrated (604-1 thru 604-3).

Finally, before turning to the detailed description of the methods contemplated by the invention, with specific reference to FIGS. 7–12, it should be noted that in addition to the data integrity protection techniques contemplated by the invention eliminating the need to write to the above described (disk resident) control structures after the aforementioned data storage initialization process (explained with reference to FIG. 9) has been completed; another key factor in maintaining data integrity, in accordance with the teachings of the invention, is the ability to restart the data storage system (removable medium) following a CPU reset or power down condition.

According to the preferred embodiment of the invention, this restart capability is realized by: (a) maintaining data records in the recording instrument's internal memory (preferably a backed memory such as backed RAM) until the records have been successfully transferred to disk; (b) managing the data storage and disk update processes using a series of atomic "go/no-go" operations to prevent corruption of data blocks; and (c) maintaining a "duplicate" block image on disk for performing the aforementioned (optional) memory loss recovery processing in the event of a RAM loss condition.

According to the preferred embodiment of the invention, the steps listed above (steps (a)–(c)) are employed when implementing the preferred illustrative processes described hereinafter with reference to FIGS. 7–12. Those skilled in the art will recognize that the sequence of certain steps in the illustrative processes themselves (the processes depicted and described with reference to FIGS. 7–12), may be altered; that certain of the illustrated process steps may be eliminated (for example, where optional RAM loss condition processing is not practiced), etc., without departing from the scope or spirit of the invention which is intended to be limited only by the claims appended hereto.

Figure 7:
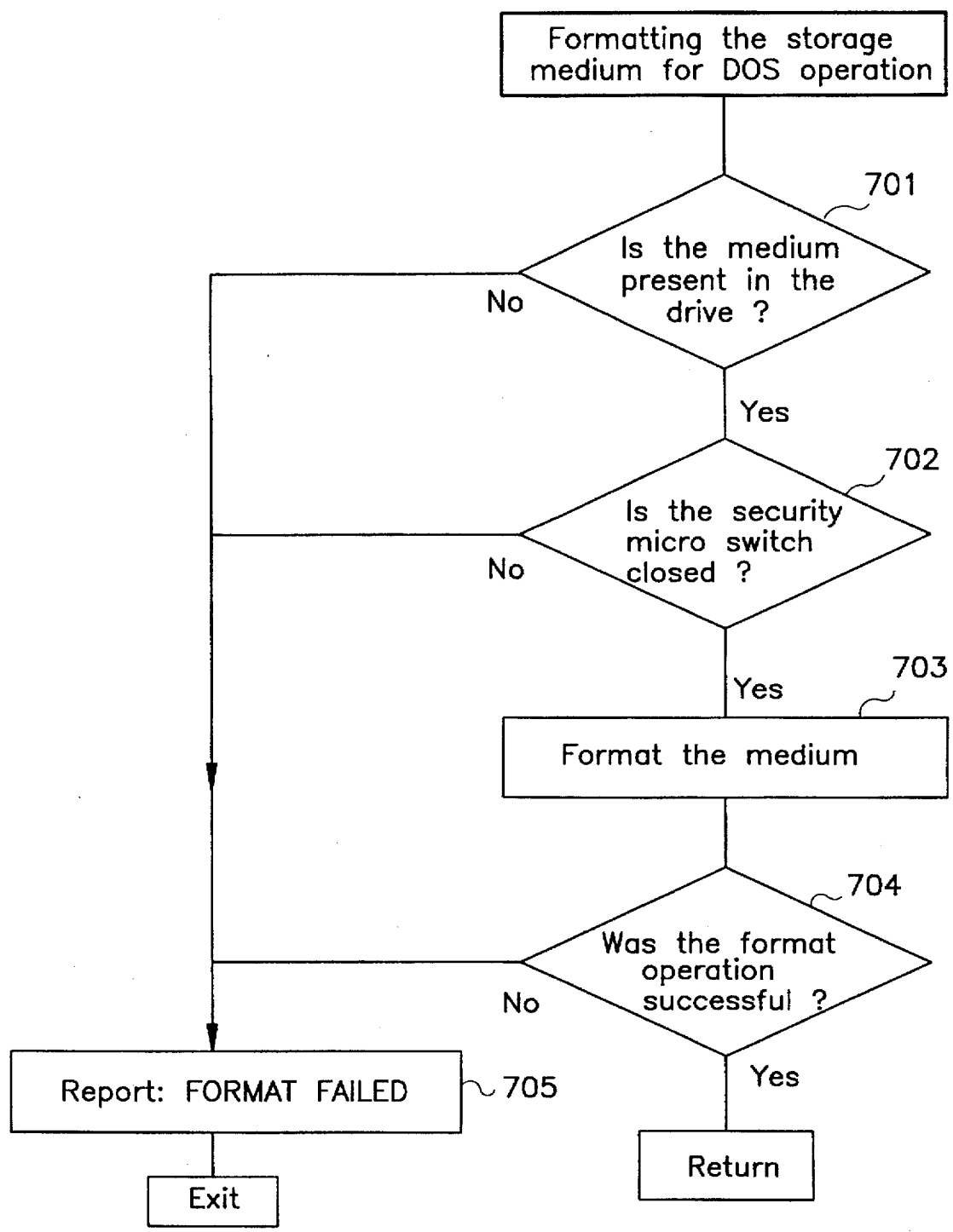
FIG. 7 depicts, in accordance with the teachings of one embodiment of the invention, an illustrative set of process steps for formatting the storage medium.

Reference should now be made to FIG. 7 which depicts, in accordance with the teachings of one embodiment of the invention, an illustrative set of process steps for formatting the storage medium.

In particular, FIG. 7 depicts the formatting process as including the following steps: determining if the medium is properly inserted in the instrument (step 701); determining if the micro switch door (door 107 shown in FIG. 1) is closed (step 702); formatting the medium itself (using, for example, a file management utility such as DOS), if the medium is properly inserted in the instrument (step 703); and then determining if the format operation was performed successfully (step 704). If the results of any of the aforementioned steps of determining is negative, a "Format Failed" report is shown generated at step 705.

The actual step of formatting the media per se (step 703) prepares the disk for both physical and logical access under the exemplary DOS operating system. During the format process all sectors of the disk are tested for both read and write access. "Bad" sectors are identified as being bad in the DOS File Allocation Tables (FAT). The DOS Boot Record is also created during format.

According to the invention, the formatting process described with reference to FIG. 7, must be performed prior to the data storage initialization process described hereinafter with reference to FIG. 9.

Figure 8:
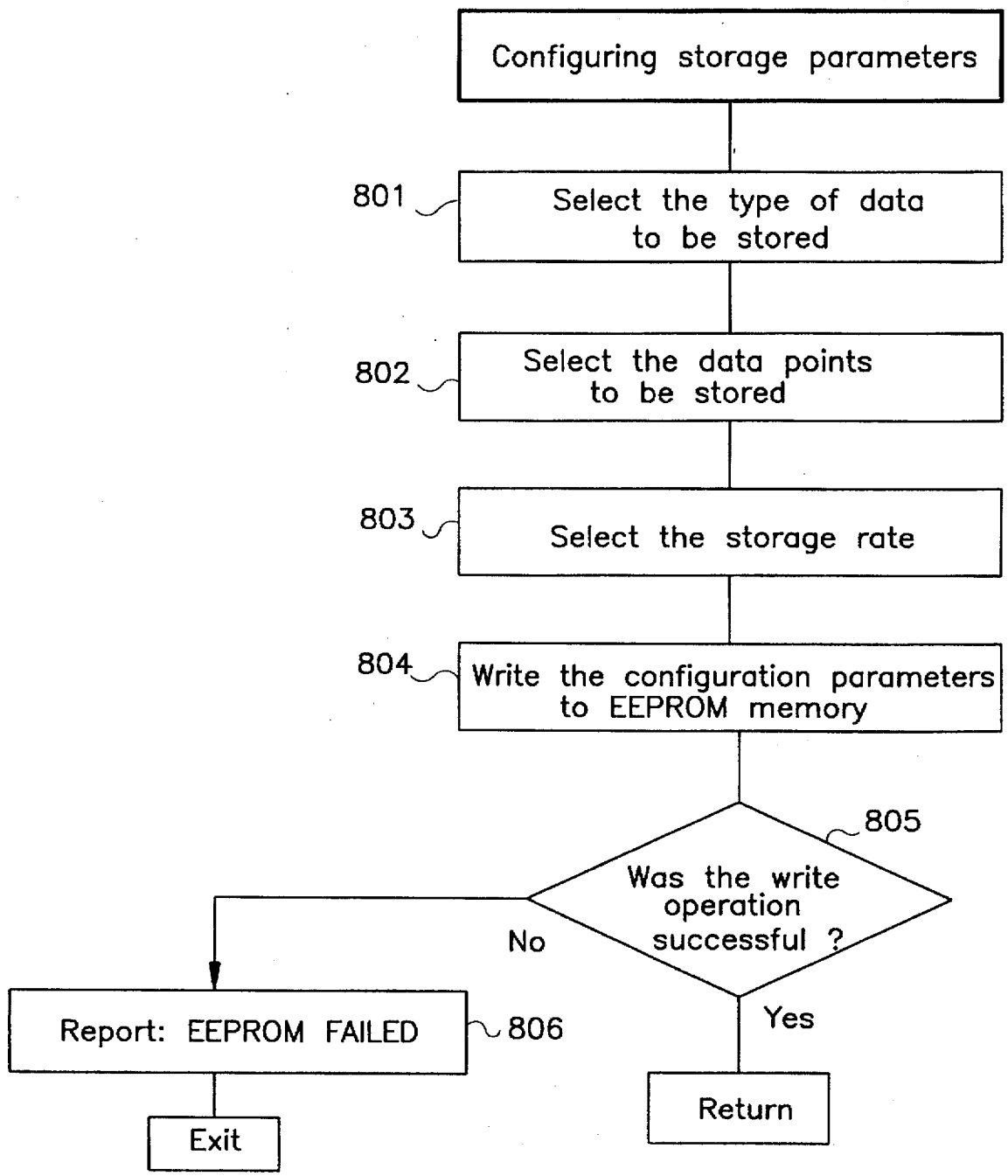
FIG. 8 depicts, in accordance with the teachings of one embodiment of the invention, an illustrative set of process steps for configuring non-volatile memory with a set of storage operation parameters.

Reference should now be made to FIG. 8 which depicts, in accordance with the teachings of one embodiment of the invention, an illustrative set of process steps for configuring non-volatile memory with a set of storage operation parameters.

The user must configure the parameters under which the storage system will operate. These parameters include (for a typical process data recording system): (a) the type of data to be stored (process data, alarms, events, etc); (b) the data points to be stored; and (c) the rate of storage. Those skilled in the art will realize that this list of parameters is set forth for the sake of illustration only and that a fewer or greater number of parameters may be appropriate depending on the application in which the recording instrument is being employed.

According to the preferred embodiment of the invention, the configuration information (user setup information) is stored in a non-volatile memory device, such as an EEPROM. As indicated hereinbefore, the term "non-volatile memory" refers (in addition to the exemplary EEPROM), to ROM, PROM and any other type of memory device that maintains its content without power. The setup information is used to partition the disk during the data storage initialization process described hereinafter with reference to FIG. 9.

The illustrative process for performing the configuration process described hereinabove may be seen, with reference to FIG. 8, to include steps for specifying the aforementioned application dependent parameters (shown performed at steps 801–803 for the specific illustrative parameters discussed hereinabove); and storing the specified parameters in non-volatile memory (step 804, with EEPROM being used as an exemplary form of non-volatile memory).

The further step of verifying that storing the specified parameters in non-volatile memory was successful, is shown as step 805 in FIG. 8. In the event that the storage operation does not succeed, a "EEPROM Failed" report is shown generated at step 806.

Figure 9:
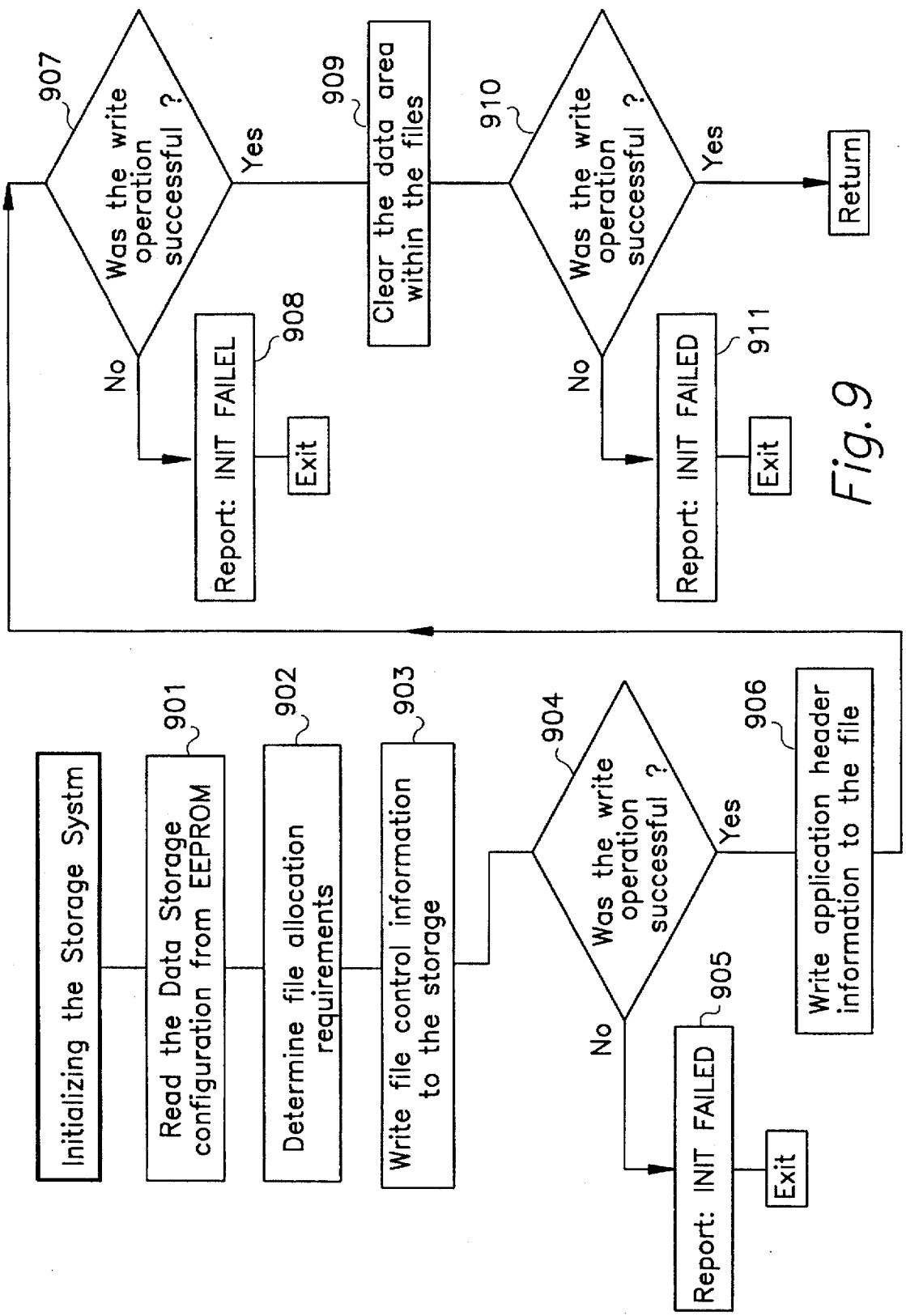
FIG. 9 depicts, in accordance with the teachings of one embodiment of the invention, an illustrative set of process steps for initializing the storage medium.

Reference should now be made to FIG. 9 which depicts, in accordance with the teachings of one embodiment of the invention, an illustrative set of process steps for initializing the storage medium (referred to hereinbefore as performing data storage initialization).

The primary purpose of initialization is to prepare the disk for secure data storage operation. The non-volatile user setup information tells the initialization process how to partition the disk.

According to the illustrative embodiment of the invention depicted in FIG. 9, the following actions are performed during initialization: read the data storage configuration stored in non-volatile memory (step 901); determine the file allocation requirements (step 902) from the configuration data, specifically the number of files needed and file size as specified by the user (or otherwise derived by the data processing device included in the recording instrument) during setup; and then create the actual files on the disk, including writing file control information to the storage medium (step 903).

The further step of verifying that the write operation was successful, is shown as step 904 in FIG. 9. In the event that the write operation does not succeed, a "INIT Failed" report is shown generated at step 905.

FIG. 9 goes on to illustrate steps directed to creating and storing the aforementioned (optional) static header onto the disk.

Where the static header is used, the header information is shown written to disk at step 906; followed by the step of verifying that the write operation performed at step 906 was successful (at step 907). Again, an "INIT Failed" report is shown generated (at step 908) if the write to disk of the static header was unsuccessful.

Finally, FIG. 9 goes on to show the step of clearing the data area within the files (step 909) as an added preferred step (not necessary in all embodiments of the invention) to insure file integrity. For example, the step of clearing could be performed by writing all zeros to the file space. An "INIT Failed" report is also generated (step 911) if the clearing operation (when employed) is unsuccessful.

Once again, according to the invention, disk space allocation is performed during the above described initialization process only. This means that no further write-access the various illustrative control structure discussed hereinabove (the Boot Record, FAT, Root Directory, or Static Header) will be performed for this disk. Also, no data blocks are written to the disk until the initialization process is complete.

Figure 10A:
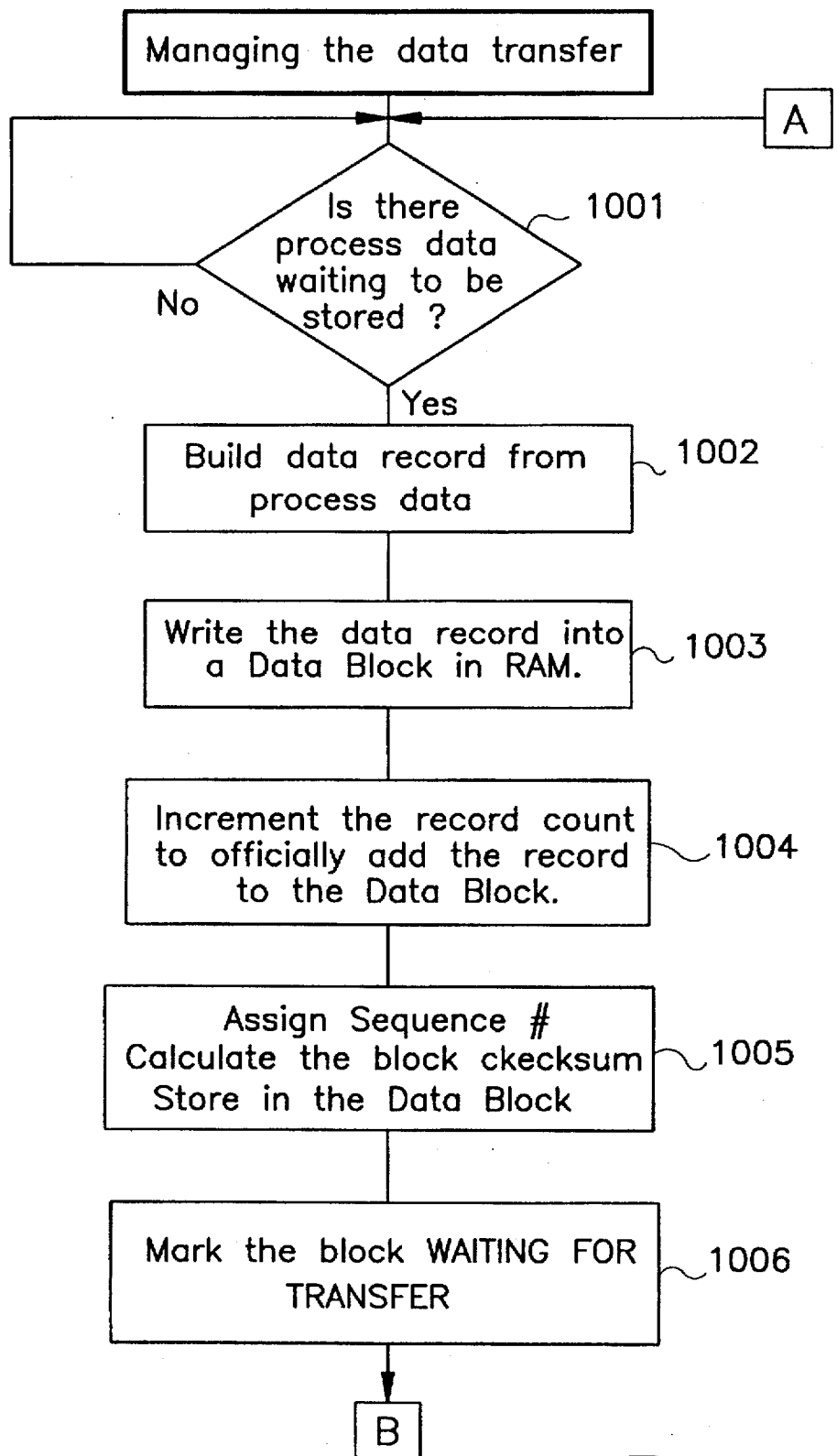

Reference should now be made to FIG. 10A and FIG. 10B which depict, in accordance with the teachings of the invention, an illustrative set of process steps for managing the data transfer process contemplated by the invention.

As indicated hereinabove, the recording instrument contemplated by the invention maintains a series of data block structures in RAM memory (preferably backed RAM) that are used to stage the data records prior to their storage on disk. Each data block structure contains an exact image of a data block on the disk. The size of each Data Block is preferably selected to match the allocation unit of the disk (512 bytes for a 1.44 Mbyte floppy disk or a 512K memory card). This would tend minimize loss of data if corruption occurs.

In order to prevent the corruption of the data block structures in RAM, and to provide a secure transfer of the data record to the disk (and be able to detect the corruption of data block structures transferred to disk), the following processing and feedback sequence (depicted in FIG. 10A and continued in FIG. 10B) may be used: determine if there exists any process data received and/or derived by the instrument waiting to be stored in the RAM (shown as step 1001 in FIG. 10A); build data records from any process data waiting to be stored (step 1002); write a record created at step 1002 to a predefined RAM data block (step 1003); keep track of the number of records built and stored by, for example, incrementing a record count to officially add the record the data block (step 1004); assign a block sequence number, preferably calculate the aforementioned block checksum (described hereinbefore with reference to FIG. 6), and store both of these values in the block (step 1005); mark each block that is ready for transfer to the medium with an indication that it is ready for transfer (step 1006), by for example setting a flag associated with the block stored in RAM; determine, whenever the removable medium is to be periodically updated (an option; not a requirement to practice the invention), if it is time for the periodic update (step 1007); determine if there are blocks in RAM waiting to be transferred (step 1008); determine whether or not the removable medium is properly inserted in the instrument, i.e., for the apparatus depicted in FIG. 1 and FIG. 2, determine if the micro switch door closed with the removable medium properly inserted therein (step 1009); write a data block awaiting transfer to the removable storage medium (step 1010) if the removable media is properly inserted in the instrument; determine if the write operation was successful (step 1011), by, for example, reading the aforementioned check sum value (if created and stored in the data block); and mark the data block in RAM as "Transfer Completed" to indicate the transfer was complete whenever it is determined by step 1011 that the write operation to disk was successful (step 1012).

With respect to performing step 1010 in FIG. 10B (the step of write a data block awaiting transfer to the removable storage medium), what is implied, although not specifically shown in FIG. 10B, is that the write is to two places in a given file when the aforementioned block recovery option is used; namely to the block recovery area first and then the given data block itself.

By utilizing the preferred process depicted in FIG. 10A and FIG. 10B, marking the block in RAM as "Transfer Completed" (step 1012), completes the feedback path required to determine a successful write to disk has occurred.

If the write fails, the block will remain marked as awaiting transfer, and will be maintained in the internal RAM (preferably backed RAM), until the next update cycle or asynchronous attempt (depending on application) is made to write to disk again.

When cyclic updating of disk is performed, the cycle will be repeated at periodic intervals until the block has been successfully transferred to disk, at which point in time the block will have been marked as "Transfer Completed". After a block is marked as "Transfer Completed" it may be cleared and recycled as needed. Those skilled in the art will readily appreciate that the periodic update option is useful in preserving the life of certain types of removable storage media (e.g., a floppy disk).

As indicated hereinabove, if the memory loss recovery option is used, each data block will be written to the disk file twice: once to the normal data area, and once to the special block recovery area. The duplicate block will be used to restore the corresponding block in the data area in the event that RAM is lost during a power-down, as will be explained in greater detail hereinafter with reference to FIG. 12.

Figure 11:
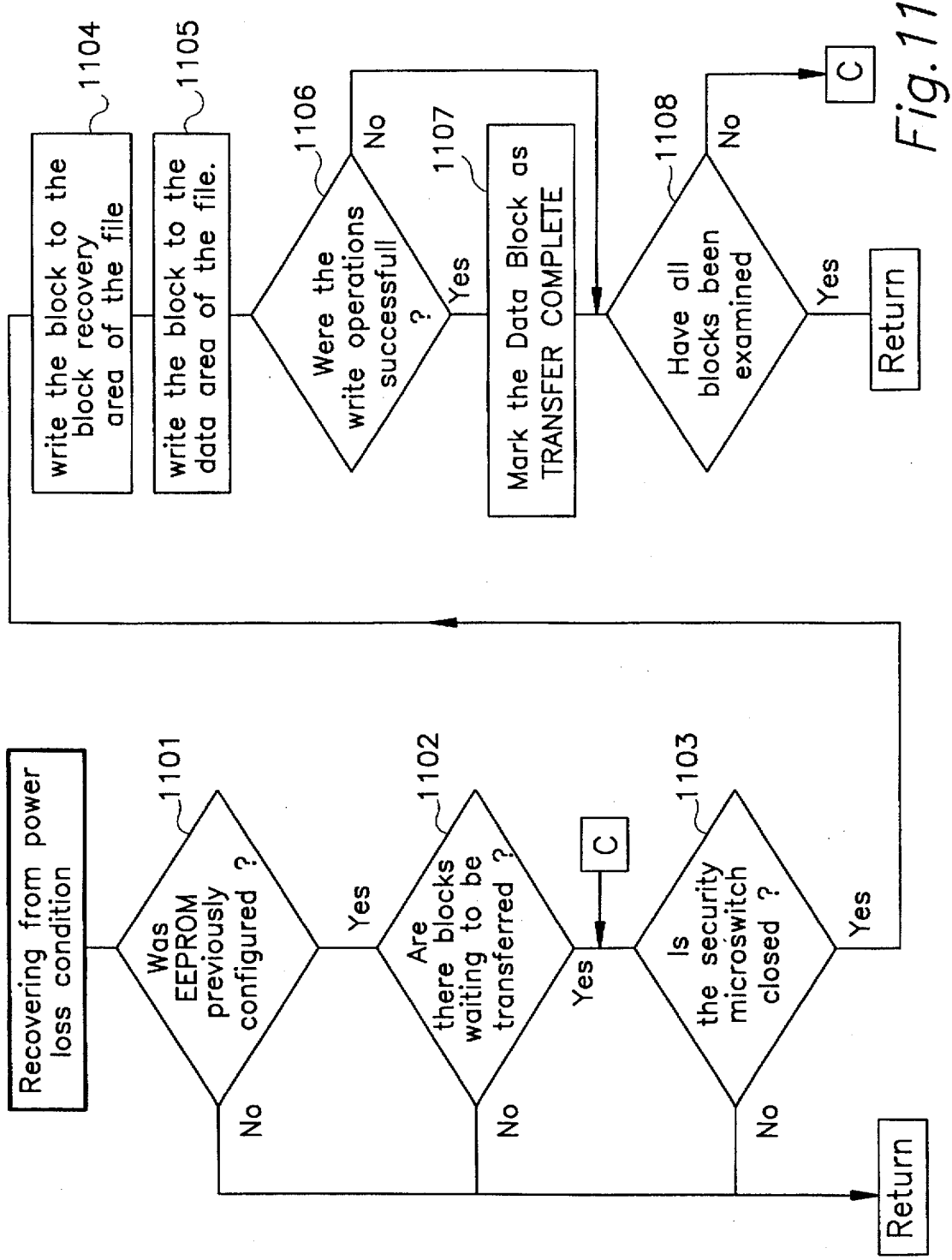
FIG. 11 depicts, in accordance with the teachings of one embodiment of the invention, an illustrative set of process steps for recovering from a power loss condition.

Reference should now be made to FIG. 11 which depicts, in accordance with the teachings of one embodiment of the invention, an illustrative set of process steps for recovering from a power loss condition.

According to the preferred embodiment of the invention, all untransferred blocks in the RAM area upon a restart (blocks marked as awaiting transfer) are located and then writes to disk are attempted for each such block. This resumes the feedback process described hereinbefore. If a data block on disk had been corrupted because of a power down, this process will restore it by overwriting it with the RAM-resident copy.

More particularly, with reference to FIG. 11, an exemplary set of process steps contemplated by the invention to perform the aforestated functions include: determining, after a power loss condition, if the non-volatile memory was previously configured (step 1101); determining if there are any data blocks that are marked as awaiting transfer to the removable medium (step 1102); determining if said medium is properly inserted in said instrument, i.e., inserted in the recording instrument with door 107 closed when using an instrument of the type depicted in FIG. 1 (step 1103); writing a block awaiting transfer to a target file on the medium to the recovery area of the target file, if the optional recovery area discussed hereinbefore (shown at 502 in FIG. 5) is used (step 1104); writing a block awaiting transfer to a target file on the medium, to the data storage portion (shown, for example, at 503-1 in FIG. 5) of the target file (step 1105); determining if the write operations performed in step 1104 (if performed) and step 1105 were successful (step 1106); marking each data block successfully transferred to the medium to indicate the transfer was complete whenever it is determined in step 1106 that the write operation(s) was (were) successful (step 1107); and determining if all blocks have been examined subsequent to experiencing a given loss of power condition (step 1108).

Figure 12:
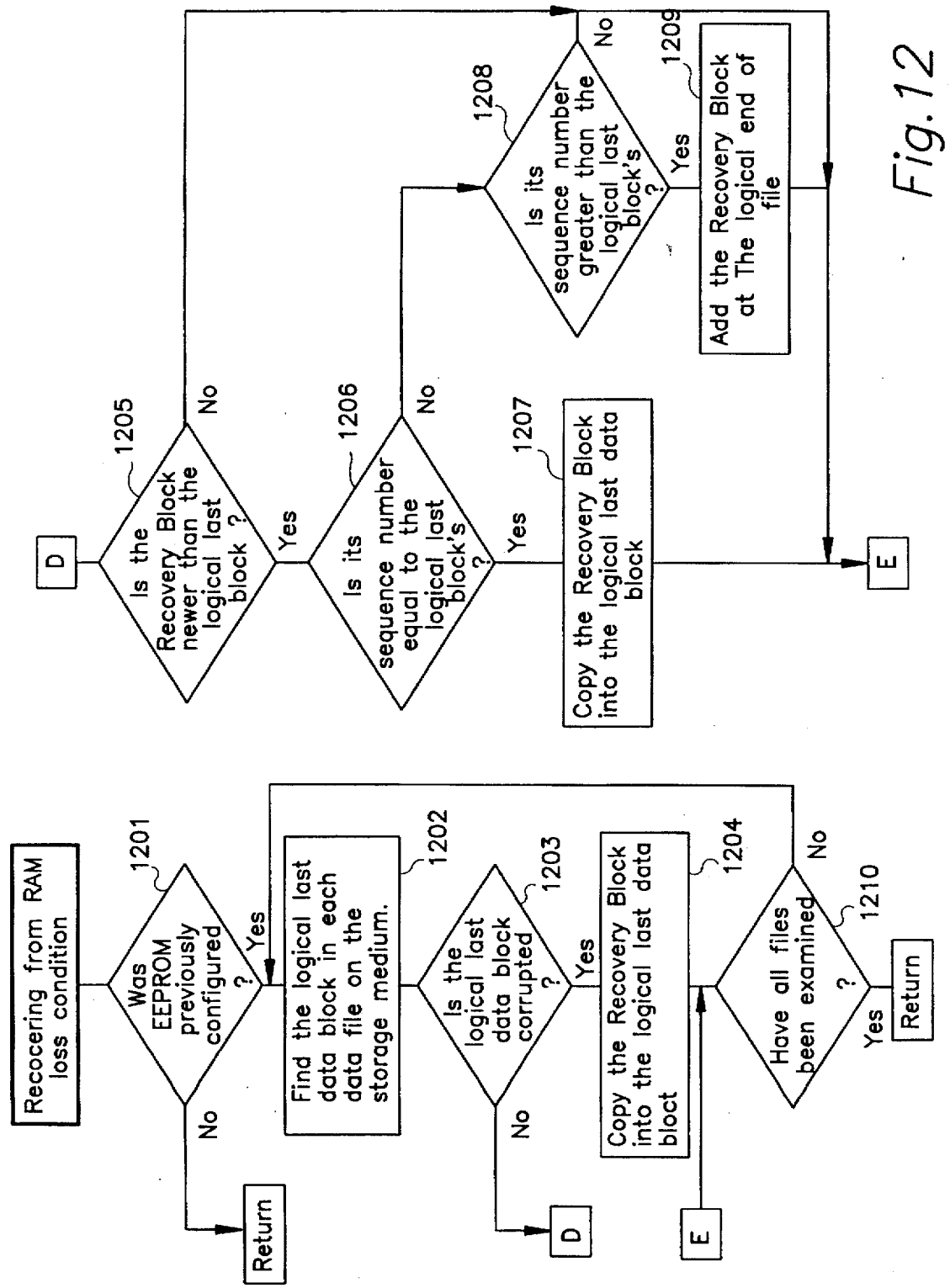
FIG. 12 depicts, in accordance with the teachings of one embodiment of the invention, an illustrative set of process steps for recovering from a RAM loss condition.

Reference should now be made to FIG. 12 which depicts, in accordance with the teachings of one embodiment of the invention, a set of exemplary process steps for recovering from a RAM loss condition, as defined hereinbefore.

If the capacitor-backed RAM (or RAM which is not backed) has been lost, the exemplary memory loss recovery process set forth hereinafter can be used to attempt to restore and/or repair a corrupted data block on disk.

The process involves the following steps which are illustrated in FIG. 12: determining, after a RAM loss condition has occurred, if the non-volatile memory was previously configured and the security micro switch is closed (step 1201); if so, finding the logical last data block in each disk file (step 1202) to determine if corruption has occurred (step 1203) by, for example, testing the block checksum value; and (if corruption has occurred), the contents of the "duplicate" block in the aforementioned recovery area (if this option is used), should be copied into the logical last data block, overwriting the corrupted contents of the logical last data block (step 1204).

Not shown in FIG. 12, since it constitutes an alternate embodiment of the invention, the corrupted logical last data block could be "repaired" if no copy were maintained in the recovery area. A block could be "repaired", for example, by assigning the next logical sequence number to the block being repaired; setting its record count to zero; calculating a block checksum value; and then rewriting the "repaired" block to disk.

The illustrative process depicted in FIG. 12 continues with steps 1205–1209 only if (1) the block recovery area option is used; and (2) a determination at step 1203 is made that a given data block is not corrupted. In particular, steps 1205–1209 involve: determining if the data block written in the recovery area (now assumed to be used) for the file is newer than the logical last block (step 1205); determining, whenever it is determined at step 1205 that the data block written in the recovery area for the file is newer than the logical last block, if the sequence number for the data block written in the recovery area equals the sequence number for the logical last data block (step 1206); copying the data block written in the recovery area for the file into the last logical data block whenever it is determined in step 1206 that the sequence number for the data block written in the recovery area equals the sequence number for the logical last data block (step 1207); determining, whenever it is determined in step 1206 that the sequence number for the data block written in the recovery area does not equal the sequence number for the logical last data block, if the sequence number for the data block written in the recovery area is greater than the sequence number for said logical last data block (step 1208); and adding the data block written in the recovery area at the logical end of the given file whenever it is determined at step 1208 that the sequence number for the data block written in the recovery area is greater than the sequence number for the logical last data block (step 1209).

The process depicted in FIG. 12 concludes with step 1210, which follows the performance of any of steps 1204, 1207, 1208 or 1209 (arrived at based on the results of the various determinations made at steps 1203, 1205, 1206 and 1208 shown in FIG. 12), which causes the process depicted in FIG. 12 to be iterated when files remain to be examined (after a given pass through the FIG. 12 process), following the occurrence of a RAM loss condition.

What has been described in detail hereinabove are methods and apparatus which meet all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

For example, the aforementioned teaching for protecting the integrity of process data transferred to and stored on a removable storage media, associated with a programmable stand alone data recording instrument, may be applied to protect the integrity of process data transferred to and stored on fixed storage media (installed or external) associated with such instruments.

The embodiments and examples set forth herein were presented in order to best explain the principles of the instant invention and its practical application to thereby enable others skilled in the art to best utilize the instant invention in various embodiments and with various modifications as are suited to the particular use contemplated.

In view of the above it is, therefore, to be understood that the claims appended hereto are intended to cover all such modifications and variations which fall within the true scope and spirit of the invention.

What is claimed is:

1. A method for protecting the integrity of process data stored on a removable storage media associated with a programmable stand alone data recording instrument that includes a Random Access Memory (RAM) and non-volatile memory, comprising the steps of:

(a) formatting said removable storage media;
 (b) configuring a set of storage parameters used to partition said media, wherein said step of configuring includes the steps of specifying said parameters and storing the specified parameters in non-volatile memory;
 (c) initializing said storage media for secure data storage operation by partitioning said media into a set of files utilizing the set of storage parameters stored in non-volatile memory to provide the ability to protect the integrity of data during a power outage and to recover data thereafter; and
 (d) generating a signal indicative of whether or not said medium is properly inserted in said instrument, including the step of determining if a door, covering an opening in said instrument into which said medium may be removably inserted, is open or not; and
 (e) managing process data received and/or derived by said instrument and the transfer of said data to said media, wherein said step of managing includes the steps of:
  (e1) building and storing data records in predefined RAM data blocks utilizing said data;
  (e2) keeping track of the number of records built and stored;
  (e3) marking each block that is ready for transfer to said medium;
  (e4) determining, in response to said signal indicative of whether or not said medium is properly inserted in said instrument, if said media is properly inserted therein;
  (e5) writing to a file on said medium one of the blocks awaiting transfer thereto after it is determined in step (e4) that the removable media is properly inserted in said instrument;
  (e6) determining if the write operation was successful; and
  (e7) marking the data block in RAM to indicate the transfer was complete whenever it is determined in step (e6) that the write operation was successful.

2. A method as set forth in claim 1 wherein said step of initializing further comprises the step of performing a one time allocation of file space on said medium to thereby protect media file control structures from being corrupted.

3. A method as set forth in claim 2 wherein said step of managing further comprises the step of organizing process data within a given file into independent blocks.

4. A method as set forth in claim 3 wherein said independent blocks are sequenced.

5. A method as set forth in claim 4 wherein said independent blocks are checksummed to enable the presence of corruption to be detected after a data transfer operation is complete.

6. A method as set forth in claim 1 wherein said step of formatting further comprises the steps of:
 (a) determining if said medium is properly inserted in said instrument;
 (b) utilizing a file management utility to format the medium if properly inserted in said instrument; and
 (c) verifying that the format operation performed under said utility was successful.

7. A method as set forth in claim 1 wherein said step of configuring and said step of specifying included therein, further comprises the steps of:
 (a) selecting the type of data to be stored;
 (b) selecting the data points to be stored; and
 (c) selecting the data storage rate.

8. A method as set forth in claim 1 wherein said step of configuring further comprises the step of verifying that said step of storing the specified parameters in non-volatile memory was successful.

9. A method as set forth in claim 2 wherein said step of performing a one time allocation of file space on said medium, further comprises the steps of:
 (a) reading said specified parameters stored in non-volatile memory;
 (b) determining file allocation requirements utilizing said specified parameters;

(c) writing file control information to said media; and (d) determining if the step of writing file control information to said media was successful.

10. A method as set forth in claim 9 further comprising the steps of:

(a) writing application header information to said media for each file created; and (b) determining if the step of writing application header information to said media for each file created was successful.

11. A method as set forth in claim 9 further comprising the steps of clearing the data area within each file on said medium and determining if said clearing step was successful.

12. A method as set forth in claim 1 wherein said step of managing further comprises the step of determining if process data received and/or derived by said instrument is waiting to be stored.

13. A method as set forth in claim 1 wherein said step of managing further comprises the step of periodically determining if any block is awaiting transfer to said medium.

14. A method as set forth in claim 1 wherein said step of managing further comprises the step of providing each block that is ready for transfer to said medium with a check value which may be used to determine if a block transfer is successful.

15. A method as set forth in claim 1 wherein said step of writing to said medium further comprises the steps of first writing a block awaiting transfer to said medium to a recovery area in a given file located thereon and then writing the same data block to a data storage portion of said file.

16. A method as set forth in claim 15 wherein said step of managing further comprises the step of providing each block that is ready for transfer to said medium with a sequence number to enable a recovered block to be properly inserted in the sequence of blocks in the file on said medium in the event of a RAM loss condition.

17. A method as set forth in claim 15 further comprising the steps of:

(a) determining, after a power loss condition, if said non-volatile memory was previously configured;

(b) determining if there are any data blocks that are marked as awaiting transfer to said medium;

(c) determining if said medium is properly inserted in said instrument;

(d) writing a block awaiting transfer to a target file on said medium to the recovery area of said target file;

(e) writing a block awaiting transfer to a target file on said medium to the data storage portion of said target file;

(f) determining if the write operations performed in steps (d) and (e) were successful; and (g) marking each data block successfully transferred to said medium to indicate the transfer was complete whenever it is determined in step (f) that the write operations were successful.

18. A method as set forth in claim 17 further comprising the step of determining if all blocks have been examined subsequent to experiencing a given loss of power condition.

19. A method as set forth in claim 1 further comprising the steps of:

(a) determining, after a power loss condition, if said non-volatile memory was previously configured;

(b) determining if there are any data blocks that are marked as awaiting transfer to said medium;

(c) determining if said medium is properly inserted in said instrument;

(d) writing a block awaiting transfer to a target file on said medium to said target file;

(e) determining if the write operation performed in step (d) was successful; and (f) marking each data block successfully transferred to said medium to indicate the transfer was complete whenever it is determined in step (e) that the write operation was successful.

20. A method as set forth in claim 16 further comprising the steps of:

(a) determining, after a RAM loss condition, if said non-volatile memory was previously configured and if said medium is properly inserted in said instrument;

(b) locating the last logical data block in each data file on said medium;

(c) determining if the last logical data block located in a given data file is corrupted;

(d) copying the data block written in said recovery area for said file into said last logical data block whenever it is determined in step (c) that said given data block was corrupted;

(e) determining, whenever said given data block is not corrupted, if the data block written in said recovery area for said file is newer than said logical last block;

(f) determining, whenever it is determined at step (e) that the data block written in said recovery area for said file is newer than said logical last block, if the sequence number for the data block written in said recovery area equals the sequence number for said logical last data block;

(g) copying the data block written in said recovery area for said file into said last logical data block whenever it is determined in step (f) that the sequence number for the data block written in said recovery area equals the sequence number for said logical last data block;

(h) determining, whenever it is determined in step (f) that the sequence number for the data block written in said recovery area does not equal the sequence number for said logical last data block, if the sequence number for the data block written in said recovery area is greater than the sequence number for said logical last data block; and (i) adding the data block written in said recovery area at the logical end of said given file whenever it is determined at step (h) that the sequence number for the data block written in said recovery area is greater than the sequence number for said logical last data block.

21. A method as set forth in claim 1 wherein said step of managing further comprises the step of providing each block that is ready for transfer to said medium with a sequence number to enable a repaired block to be properly inserted in the sequence of blocks in the file on said medium in the event of a RAM loss condition.

22. A method as set forth in claim 21 further comprising the steps of:

(a) determining, after a RAM loss condition, if said non-volatile memory was previously configured;

(b) locating the last logical data block in each data file on said medium;

(c) determining if the last logical data block located in a given data file is corrupted; and (d) repairing said last logical data block whenever it is determined in step (c) that said given data block was corrupted.

23. A method for protecting the integrity of process data stored on a fixed storage media associated with a programmable stand alone data recording instrument that includes a Random Access Memory (RAM) and non-volatile memory, comprising the steps of:

(a) formatting said removable storage media;

(b) configuring a set of storage parameters used to partition said media, wherein said step of configuring includes the steps of specifying said parameters and storing the specified parameters in non-volatile memory;

(c) initializing said storage media for secure data storage operation by partitioning said media into a set of files utilizing the set of storage parameters stored in non-volatile memory to provide the ability to protect the integrity of data during a power outage and to recover data thereafter; and (d) managing process data received and/or derived by said instrument and the transfer of said data to said media, wherein said step of managing includes the steps of:

(d1) building and storing data records in predefined RAM data blocks utilizing said data;

(d2) keeping track of the number of records built and stored;

(d3) marking each block that is ready for transfer to said medium;

(d4) writing to a file on said medium one of the blocks awaiting transfer thereto;

(d5) determining if the write operation was successful; and (d6) marking the data block in RAM to indicate the transfer was complete whenever it is determined in step (d5) that the write operation was successful.

24. Apparatus for protecting the integrity of process data stored on a removable storage media associated with a programmable stand alone data recording instrument, comprising:

(a) programmable data processing means;

(b) Input/Output means, coupled to said programmable data processing means, for receiving raw process data input to said instrument;

(c) memory means, coupled to said programmable data processing means, for temporarily storing raw process data received and/or derived by said instrument;

(d) non-volatile memory, coupled to said programmable data processing means, for storing a set of removable media configuration parameters and for providing the ability to protect the integrity of data during a power outage and to recover data thereafter;

(e) media interface means, coupled to said programmable data processing means, for receiving said removable storage medium when properly inserted therein and making said storage medium available to said programmable data processing means for data transfer operations; and (f) means for generating a signal to said programmable data processing means whenever said removable media is not properly inserted in said media interface means, including means for determining if a door, covering an opening in said instrument into which said medium may be removably inserted, is open or not, to thereby enable said programmable data processing means to recognize a condition in which data transfer operations between said memory means and said storage medium is to be inhibited.

25. Apparatus as set forth in claim 24 wherein said removable storage media is a floppy disk.

26. Apparatus as set forth in claim 24 wherein said removable storage media is a PCMCIA card.

* * * * *